United States Patent
Schlagenhaft et al.

(10) Patent No.: US 9,612,894 B2
(45) Date of Patent: Apr. 4, 2017

(54) DETECTOR FOR HIGH FREQUENCY INTERRUPTS

(71) Applicant: Freescale Semiconductor Inc., Austin, TX (US)

(72) Inventors: Rolf Dieter Schlagenhaft, Poing (DE); Alistair Paul Robertson, Glasgow (GB)

(73) Assignee: NXP USA, Inc., Austin, TX (US)

( * ) Notice: Subject to any disclaimer, the term of this patent is extended or adjusted under 35 U.S.C. 154(b) by 22 days.

(21) Appl. No.: 14/727,020

(22) Filed: Jun. 1, 2015

(65) Prior Publication Data
US 2016/0350162 A1    Dec. 1, 2016

(51) Int. Cl.
*G06F 11/00* (2006.01)
*G06F 11/07* (2006.01)
*G06F 1/10* (2006.01)
*G06F 13/24* (2006.01)

(52) U.S. Cl.
CPC ............ *G06F 11/076* (2013.01); *G06F 1/10* (2013.01); *G06F 11/0721* (2013.01); *G06F 13/24* (2013.01)

(58) Field of Classification Search
USPC ............................................. 714/47.1, 47.2
See application file for complete search history.

(56) References Cited

U.S. PATENT DOCUMENTS

| 7,386,764 | B2 | 6/2008 | LeDuc et al. |
| 7,734,945 | B1* | 6/2010 | Levidow ............ G06F 11/0793 714/3 |
| 2008/0228980 | A1 | 9/2008 | Esfandabadi |
| 2010/0299470 | A1 | 11/2010 | Uno |
| 2014/0089708 | A1 | 3/2014 | Menard et al. |
| 2014/0365813 | A1* | 12/2014 | Sim ........................ G06F 1/24 714/5.1 |

FOREIGN PATENT DOCUMENTS

EP    2256628 A1    12/2010

OTHER PUBLICATIONS

Dominik Reinhardt et al, "An Embedded Hypervisor for Safety-Relevant Automotive E/E-Systems," Industrial Embedded Systems (SIES), 9th IEEE International Symposium, 2014, pp. 189-198; 10 pages.
John Regehr et al, "Preventing Interrupt Overload," LCTES, ACM SIGPLAN Notices, 2005, vol. 40, No. 7; 9 pages.
Josef Strnadel, "Monitoring-Driven HW/SW Interrupt Overload Prevention for Embedded Real-Time Systems," 15th International IEEE Symposium on Design and Diagnostics of Electronic Circuits and Systems (DDECS), Tallin, 2012; 6 pages.

* cited by examiner

*Primary Examiner* — Sarai Butler (57) ABSTRACT

High frequency detection of interrupts includes incrementing a count by a first number in response to at least one interrupt. The count is decremented by a second number in response to a clock if the count is greater than zero. An interrupt rate is determined from the count. A fault collection unit (FCU) is updated when the interrupt rate exceeds a threshold.

20 Claims, 6 Drawing Sheets

DETECTOR FOR HIGH FREQUENCY INTERRUPTS

FIELD

This disclosure relates generally to the detection of an erroneously elevated occurrence rate of interrupts, and more specifically to non-intrusive interrupt detection to compare an average occurrence of interrupt requests against a user defined limit.

BACKGROUND

Computing systems often are required to provide a sustained level of performance over a relatively short period of time, rather than merely relying on bursty behavior. This requirement is particularly acute for real time systems with sensor feedback loops that can become unstable if the processing of sensor signals is delayed. In addition, embedded computing systems are often very cost sensitive, and thus have peripherals with very little processing power or buffering. Many peripherals compete for the limited resources of a central processor through high priority interrupt driven requests. Such interrupts may also occur at atypically high rates due to common faults, such as broken contacts or wires, presenting safety issues in the context of automotive systems.

High frequency interrupts have typically been managed with in-line systems, between the peripherals and processor, that delay or block excessive interrupt activity. These systems often rely on estimates of allowable interrupt rates, which inadequately accounts for all but the most common operating scenarios. Furthermore, typical interrupt handling does not include the ability for different applications to tolerate different interrupt overload scenarios.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods described herein provide for the non-intrusive management of interrupts by monitoring an average occurrence of interrupts and performing an action when the average exceeds a user defined limit. Rather than merely delaying or blocking interrupts based on fixed timing intervals, the average is used with configurable time periods appropriate for the system and various applications within which the interrupts are generated. Monitoring of interrupts is non-intrusive, because it does not influence processing of interrupts by software. It only gives an indication to the system that a configured occurrence limit is exceeded, allowing the system to react in a way which is appropriate for the specific application. In one embodiment, the average is generated, in part, by selectively grouping and combining a number of interrupts used to increment a count by a configurable amount, while contemporaneously reducing the count by a series of clock transitions modified by another configurable amount.

Accordingly, the interrupt detector provides configurable diagnostics and can respond to an excess of interrupts in an application specific manner. For example, a system with a digital signal processor (DSP) may tolerate delays in servicing interrupts when a peripheral requests a direct memory access (DMA) to store captured data for storage. However, the same system may not tolerate delays in servicing DMA requests when the peripheral is storing data for imminent use in a control loop (e.g. in an image tracking application). In this case, the DSP will dynamically reconfigure the handling of the excessive average of interrupts based on the application that the DSP is executing.

In one embodiment, the interrupt detector will temporarily disable the peripheral from making DMA requests until the backlog of interrupts from various sources have been attended to. In another embodiment, an unusually high level of interrupts from one peripheral will be deemed as a potential fault condition, leading to the disabling of the peripheral. For example, a fault could occur from a broken wire or failed mechanical contact. In another embodiment an application is modified, or the interrupt routing is changed, to more efficiently manage the peripherals leading to a reduction in peak interrupt activity. In other embodiments, interrupts are grouped according to priority. In various embodiments, when the average level of interrupts exceeds the user-defined threshold, a fault collection unit (FCU) is updated. The FCU will then perform a variety of actions, including but not limited to, capturing the interrupt request, time and operation conditions for future diagnostics (either during execution, or for later downloading and analysis). The FCU may rank the action as a warning requiring no further action or as a severe alarm requiring immediate attention (e.g. disabling a peripheral). In one embodiment, the FCU resets the count to zero after the FCU is updated and responds to the excessive interrupt condition.

Figure 1:
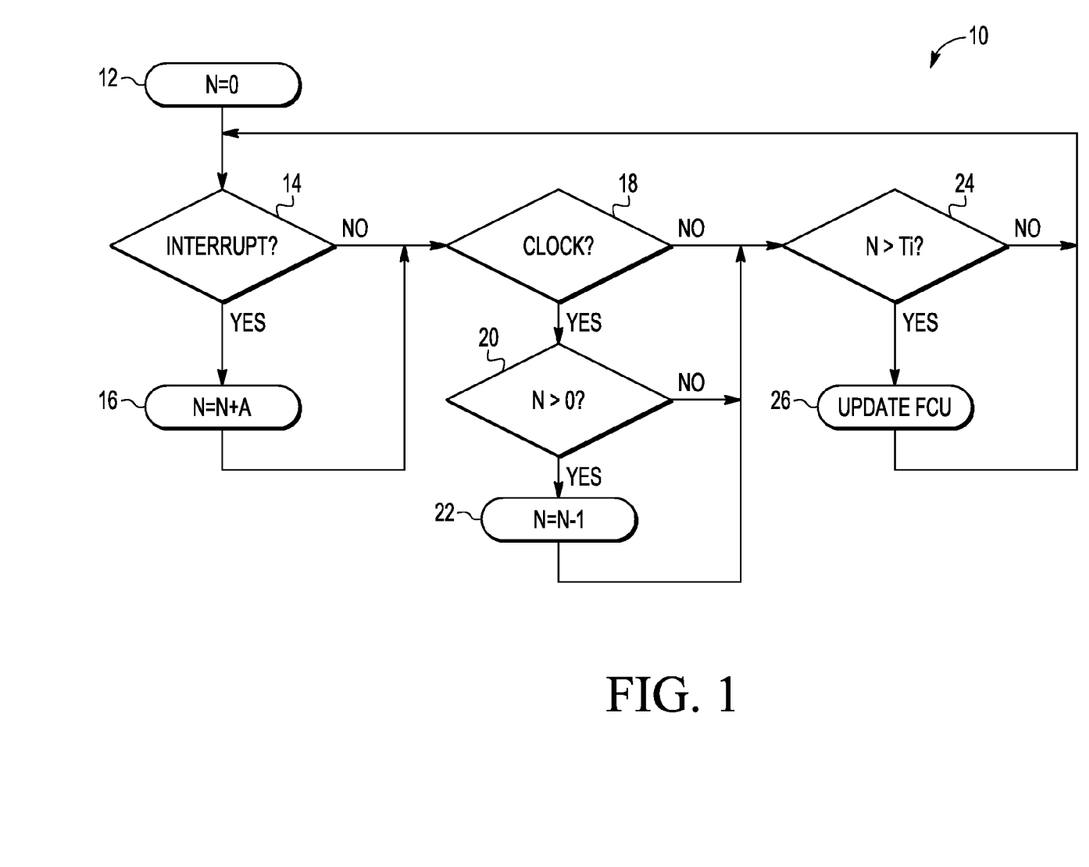
FIG. 1 is a flowchart representation of a method for detecting high frequency interrupts.

FIG. 1 shows a method 10 of detecting high frequency interrupts, in accordance with one embodiment of the present disclosure. A count (N) is reset (12) to zero. In another embodiment, the count N is reset to an offset value with the same offset added to a final threshold value (Ti), or "threshold" used to evaluate the interrupt detection. The presence of at least one interrupt is monitored (14) (e.g. either a single interrupt or a combined value of multiple interrupts is monitored). When at least one interrupt is detected, the count N is incremented (16) by a configurable first value (A), and then the state of the clock is evaluated (18). If no interrupt is detected, the interrupt detection method proceeds to evaluate the state of the clock without modification to the count N.

If a clock transition is detected, and the count N is greater than zero (20), the count N is decremented by one (22), and then the method proceeds to evaluate (24) the count N. If no clock transition is detected or N is not greater than zero (e.g. N=0), the method proceeds to evaluate (24) the count N. In one embodiment, the clock transition is defined as the leading edge of the clock (e.g. a transition from a logical low to a logical high value). In an alternate embodiment a falling edge is used. In one example, the leading edge is detected with a level detector with hysteresis.

The count N is evaluated (24) to determine if an excessive level of interrupts has been received. When the count N exceeds a user defined threshold value Ti, the FCU is updated (26) and the method 10 returns to monitor (14) for subsequent interrupts. If the count does not exceed the threshold value Ti, the method 10 returns directly to monitor (14) for subsequent interrupts. In another embodiment, the evaluation (24) checks for a count N being equal to or greater than a threshold value Ti, where the threshold value Ti is increased by one compared to the aforementioned method 10 where the count must exceed the threshold value Ti. In one embodiment, the clock evaluation (18) and the count N evaluation (20) are combined into a single operation. In another embodiment, determining if the count N is greater than zero (20) is replaced with a determination of whether N is equal to zero, and proceeds to decrement (22) the count N if the result is false. In another embodiment, a true result from the evaluation (24) of the count N results in directly updating a processor or directly affecting the device (e.g. peripheral or virtual machine) that generating one of the interrupts.

The method 10 described in FIG. 1 describes one embodiment for a detector for high frequency interrupts based on an asynchronous system, where transitions between the various operations (e.g. from 14 to 18) occurs without gating or clocking. In other embodiments, the order of the operation 14 combined with operation 16, operation 18 combined with operations 20 and 22, and operation 24 combined with operation 26 is changed. For example, in one embodiment, the clock is conditionally decremented (22) before the presence of an interrupt is determined, and the threshold value Ti is preset to a value of one less than the value of Ti when operation 14 is performed before operation 18. This adjustment to the threshold value Ti is necessary because the first evaluation (20) will be true.

In one embodiment, the method 10 is modified to implement a synchronous system, where at least operations 14 and 18 are evaluated concurrently with appropriate offsets to the interrupt and clock to maintain setup and hold margins with respect to the counter for the count N. In another embodiment, operation 16 is implemented with an up-counter, operation 22 is implemented with a separate down-counter, and operation 24 compares a difference between the up-counter and the down-counter against the threshold value Ti.

Figure 2:
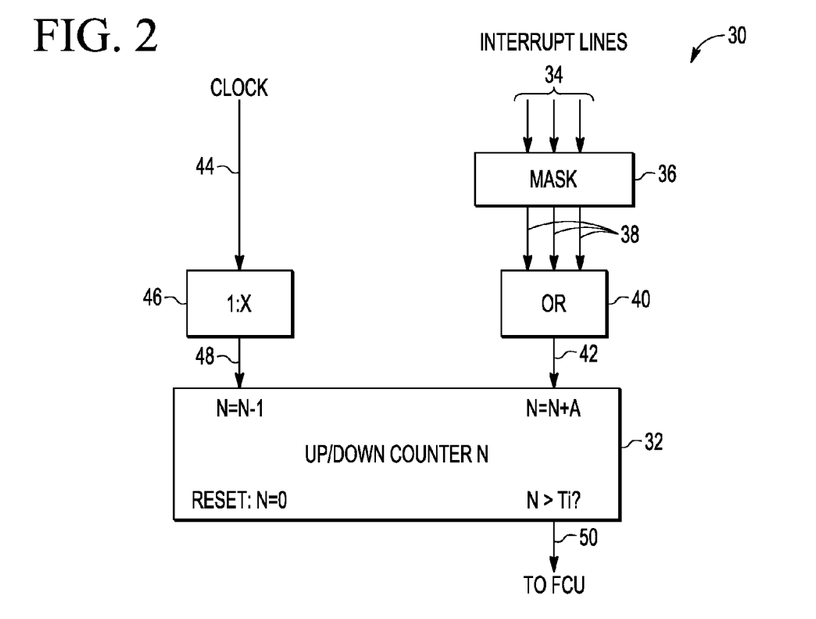
FIG. 2 is a schematic view of an embodiment of a detector for high frequency interrupts.

FIG. 2 shows an apparatus 30 of the detector for high frequency interrupts. A least one or more interrupt lines 34 are selectively enabled for detection by a mask 36. In one embodiment, the mask 36 is a configurable register that enables either interrupt lines to be either passed or blocked (e.g. by using a two input AND gate for each interrupt line). The masked interrupt lines 38 are combined with an OR function 40 to produce the interrupt indicator 42. In one embodiment, the OR function 40 is a multi-input OR gate. It should be understood that other embodiments of the OR function are realizable while keeping within the scope and spirit of this disclosure.

In one embodiment, a clock 44 is divided by a clock divider 46 to produce a divided clock 48. The clock division factor (X) is a configurable register. In another embodiment, clock division is not configurable but implemented directly in hardware. In another embodiment, the clock divider 46 is omitted and the clock 44 controls the up/down counter 32 directly. The interrupt indicator 42 and the divided clock 48 control an up/down counter 32. With reference to FIG. 1 and FIG. 2, the interrupt indicator 42 increments the count N by a first number and the divided clock decrements the count N by a second number (e.g. by one). In one embodiment, the first number A is a configurable number. The count N is reset to zero at the start of the interrupt evaluation (e.g. when the system is reset or periodically after an interrupt source is enabled or disabled). If the count N is already at zero, the divided clock will not decrement the count N below zero. The divided clock will transition at a higher rate than the generation of new interrupts, and will be set to a rate that will allow the system using the detector 30 to properly respond to the interrupts. If the count exceeds a threshold value Ti, an indication 50 is sent to an FCU to inform the FCU that action is required to handle the excessive interrupts. In some embodiments, the configuration registers for the mask 36, the first number A, the second number, the clock division factor, and the threshold value Ti are separate, while in other embodiments, they are combined in various combinations.

Figure 3:
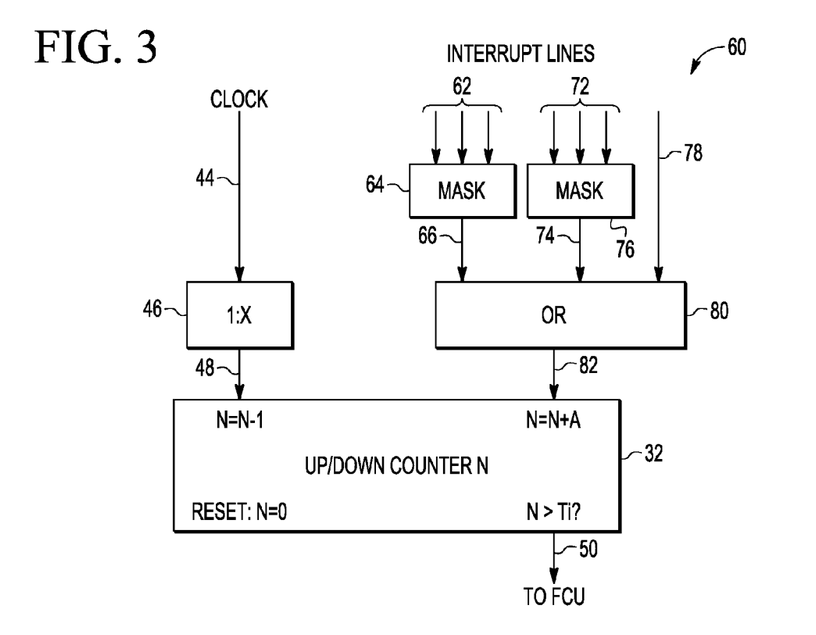
FIG. 3 is a schematic view of the embodiment of FIG. 2 with multiple masks for interrupt lines.

The embodiment 60 of FIG. 3 is a modification to the embodiment 30 of FIG. 2, wherein multiple groups of interrupt lines are evaluated. One or more interrupt lines 62 are selectively enabled for detection by mask 64. One or more interrupt lines 72 are selectively enabled for detection by mask 76. The masked interrupt lines 66 and the masked interrupt lines 74 are combined with an OR function 80 along with at least one unmasked interrupt line 78 to produce an interrupt indicator 82. In other embodiments, other combinations of groups of interrupt lines 62 and 72 and one or more interrupts 78 are combined to form the interrupt indicator 82. Each group of interrupt lines can share a common attribute, such as interrupt priority, an early warning or severe alarm or being from a similar system functional block. In one example, a functional block is a group of peripherals, or plurality of interrupts from a virtual machine. Organizing interrupts into groups with a shared attribute will facilitate an appropriate response from the FCU, when excessive interrupt activity is observed (e.g. N>Ti).

Figure 4:
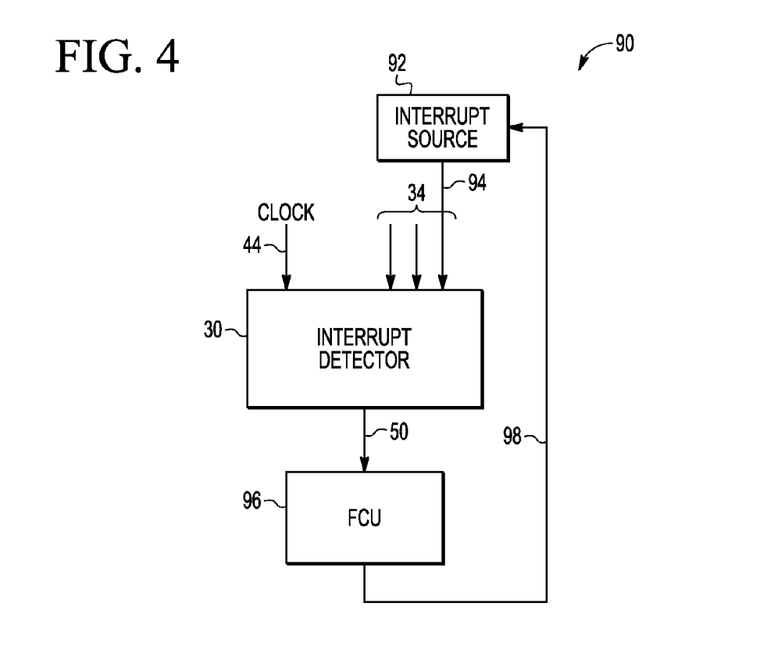
FIG. 4 is a schematic view of a system using the embodiment of FIG. 2.

FIG. 4 describes an embodiment 90 of a system for high frequency interrupt detection using the detector 30 of FIG. 2. An interrupt source 92 generates an interrupt 94, which is transmitted on one of the plurality of interrupt lines 34. Excessive interrupts from the interrupt source 92 will generate excessive combined interrupt activity (e.g. where N>Ti) causing an update 50 to be sent to the FCU 96. The FCU 96 can respond in a variety of application specific ways.

For example, in one embodiment, the interrupt source is a yaw sensor in an automobile. Excessive yaw will signal the system 90 to apply one of four brakes on the automobile to correct the yaw—a tight control loop where quick response is critical. In one example, the excessive yaw results from a failed yaw sensor or connection to the sensor. The FCU will sense that the interrupt activity is atypical and send a request 98 to disable the interrupt source 92. It should be understood this example is merely for illustrative purposes to demonstrate one of many possible responses that the FCU can make. This example is not intended to limit the scope of the detector, nor the multitude of system applications that are enabled by this flexible system for high frequency interrupt detection. In another embodiment of the system 90, the interrupt detector 60 is used in place of the interrupt detector 30.

Figure 5:
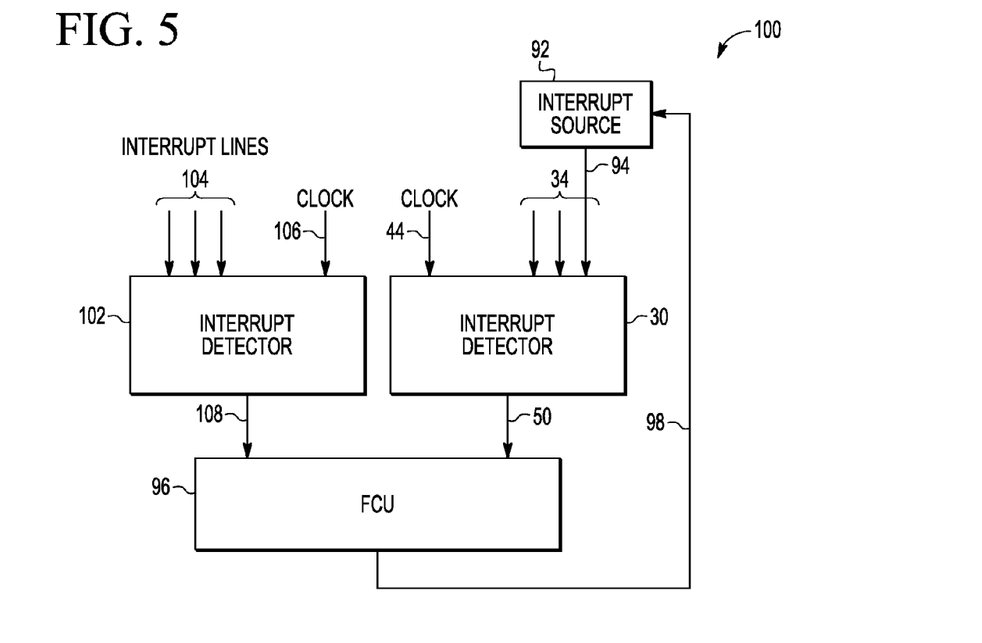
FIG. 5 is a schematic view of a system with multiple instances of a detector for high frequency interrupts.

FIG. 5 describes another embodiment 100 of a system for high frequency interrupt detection, extending the embodiment 90 of FIG. 4 to include multiple instances of the interrupt detector. Specifically, the system 100 includes a second interrupt detector 102 with at least one interrupt line 104 and a clock 106. In one example, the clock 106 and the clock 44 are the same clock. In another example, the clock 106 and clock 44 are separate clocks from a distributed clock tree or different clock generators on a system on a chip (SoC). The interrupt detector 102 is the same as interrupt detector 30 in one example, and is a variation of the detector 60 in another example. The outputs 108 and 50 from the interrupt detectors 102 and 30 respectively update the FCU 96. With inputs from multiple interrupt detectors, the FCU 96 will make application specific choices with greater finesse because the pattern of interrupt activity from the interrupt lines 34 is taken in context with the pattern of interrupt activity from other sources (e.g. the interrupt lines 104).

Figure 6:
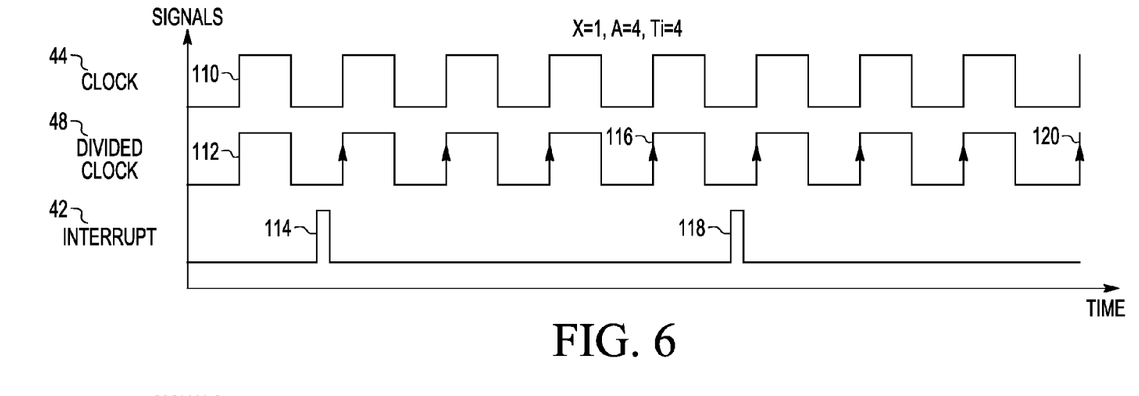
FIG. 6 is a graphical view of the timing of a detector for high frequency interrupts.

FIG. 6 through FIG. 10 shows the timing of interrupt detection using the detector 30 in FIG. 2. The detector 30 is chosen for illustrative purposes, however similar timing will result with the embodiments 60, 90 and 100 shown in FIG. 3, FIG. 4 and FIG. 5 respectively. With reference to FIG. 6, the clock division factor X is set to one, the first number is set to four and the threshold value is set to four. In this example, one interrupt is allowed for every four divided clock cycles. Specifically, the clock 44 produces a rising edge 110 that results in a rising edge 112 of the divided clock 48. The interrupt indicator 42 generates a first interrupt 114, causing the count to increment to four (e.g. N=N+A). After four divided clock 48 rising edges, the count will decrement to zero at edge 116. A second interrupt 118 will cause the count to increase to four. After four divided clock 48 rising edges, the count will once again reduce to zero at edge 120. The FCU is not updated because the count never exceeds the threshold value of four.

Figure 7:
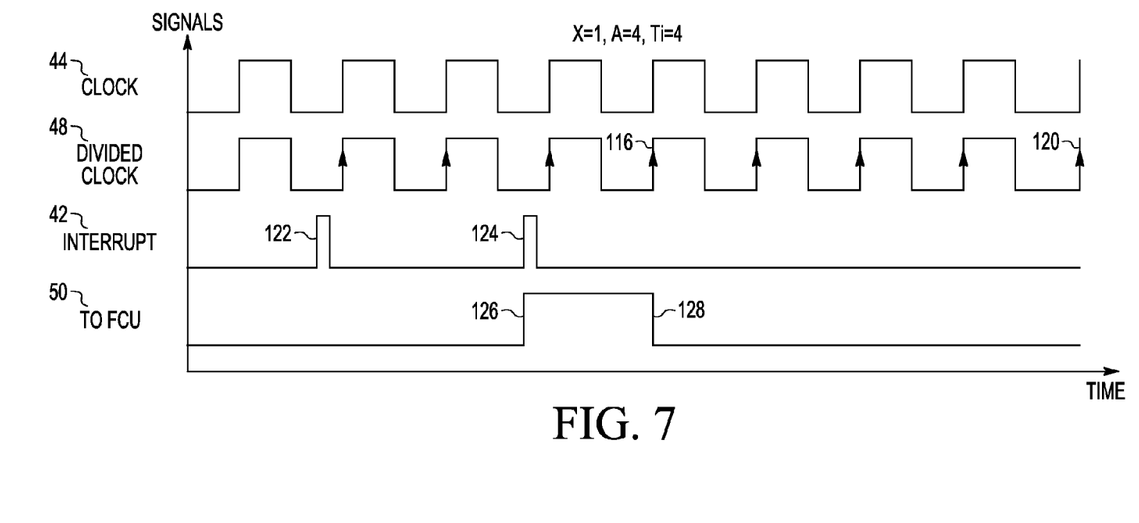
FIG. 7 is a graphical view of the timing of a detector for high frequency interrupts showing a detected fault.

FIG. 7 modifies the timing of the interrupt shown in FIG. 6. In FIG. 7, the second interrupt occurs too soon for the first interrupt to be serviced, thus resulting in an overload situation. The first interrupt 122 increments the count by four. After two divided clock 48 edges, the count will decrement to two. After the second interrupt 124, the count will increment to six, which exceeds the threshold value of four. Accordingly an update is sent to the FCU 50 to indicate an interrupt overload (e.g. a status bit is set in response to the interrupt overload). After two subsequent divided clock 48 rising edges at 116, the count has decremented four and the FCU update is removed at 128.

Figure 8:
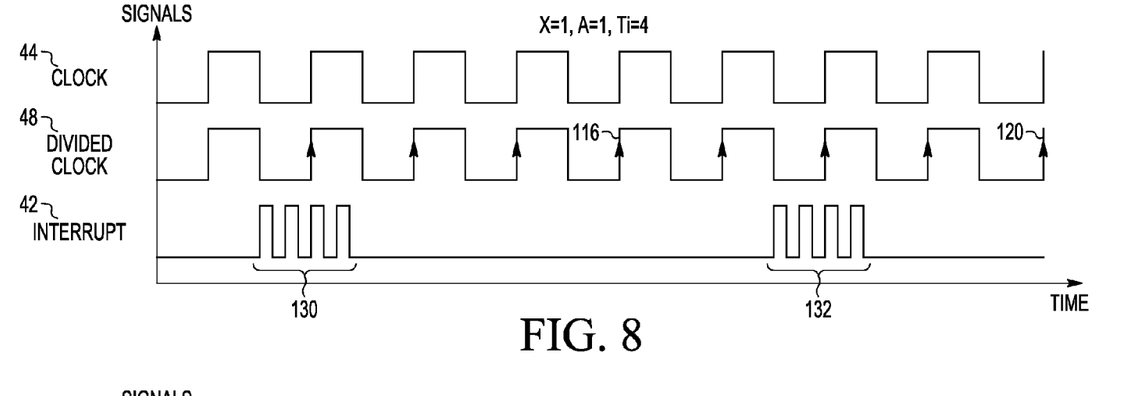
FIG. 8 is a graphical view of the timing of a detector for high frequency interrupts with an interrupt burst.

With reference to FIG. 8, the clock division factor X is set to one, the first number is set to one and the threshold value is set to four. In this example, a burst of four (or four separate interrupts) is allowed for every four divided clock cycles. Specifically, a burst of four interrupts 130 increments the count by four. After four rising edges of the divided clock 48, the count is reduced to zero at 116. The subsequent rising edge of the divided clock 48 does not reduce the count below zero. A second burst of interrupts 132 increases the count to four. After three divided clock rising edges, the count is reduced to one at 120.

Figure 9:
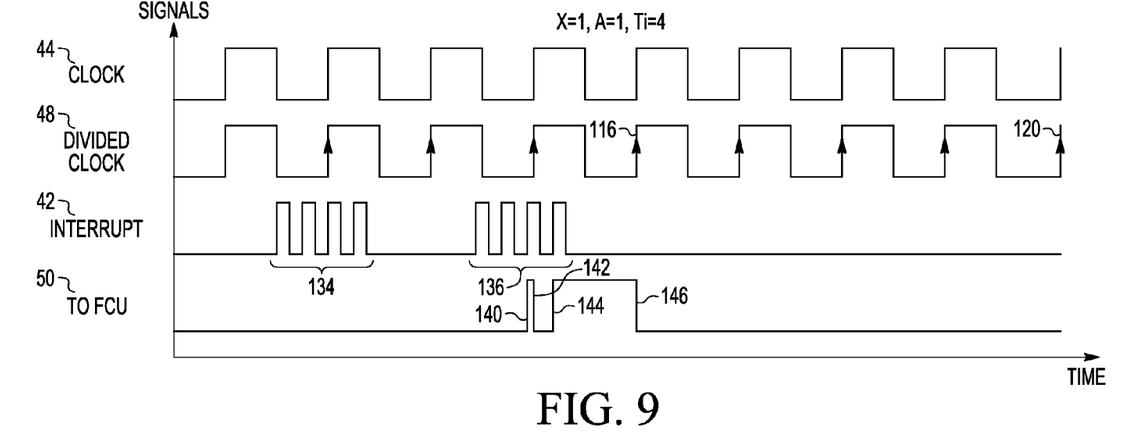
FIG. 9 is a graphical view of the timing of a detector for high frequency interrupts showing a detected fault from an interrupt burst.

FIG. 9 modifies the timing of the interrupt bursts shown in FIG. 8. After the first interrupt burst 134 and two rising edges of the divided clock 48, (one of which occurs during the interrupt burst 134), the count is two. After the third of four interrupts of the interrupt burst 136, the count is five, causing the FCU update 50 to activate (e.g. rise) at 140. The next rising edge of the divided clock 48, reduces the count to four and causes the FCU update 50 to deactivate (e.g. fall) at 142. The fourth of four interrupts of the interrupt burst 136 reactivates the FCU update 50 at 144, subsequently deactivated at 146 with the rising edge 116 of the divided clock 48. After four rising edges of the divided clock 48, the count returns to zero at 120.

Figure 10:
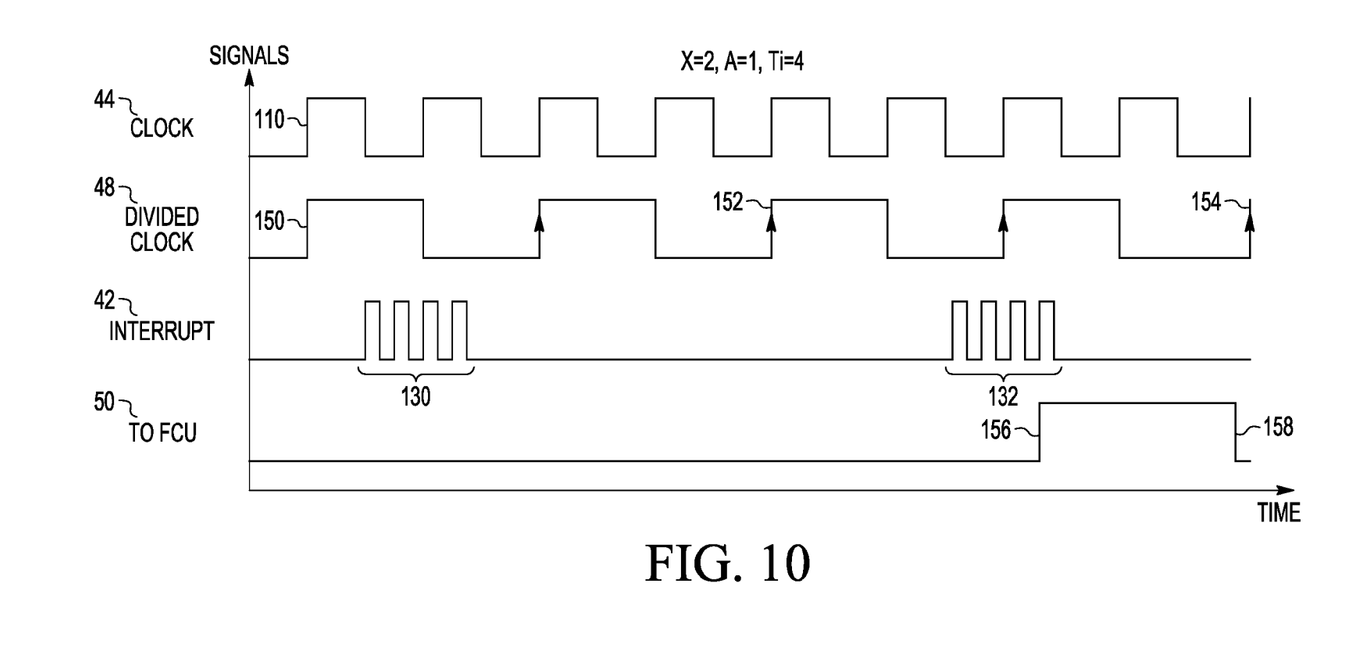
FIG. 10 is a graphical view of the timing of a detector for high frequency interrupts showing a detected fault from an interrupt burst with a divided clock.

With reference to FIG. 10, the clock division factor X is set to two, the first number is set to one and the threshold value is set to four. In this example, a burst of four (or four separate interrupts) is allowed for every four divided clock cycles, or eight clock cycles. The rising edge 110 of the clock 44 triggers a rising edge 150 of the divided clock 48. An interrupt burst 130 of four interrupts increments the count to four. After two rising edges of the divided clock 48, the count decrements to two at 152. After the first two of four interrupts in the second interrupt burst 132, the count increments to four. A subsequent rising edge of the divided clock 48 decrements the count to three. After the last interrupt in the interrupt burst 132, the count increments to five and the update to the FCU 50 is activated at 156. After the next rising edge of the divided clock 48, the count decrements to four at 154 and the update to the FCU deactivates at 158.

As will be appreciated, embodiments as disclosed include at least the following. In one embodiment, a method for high occurrence rate detection of interrupts comprises incrementing a count by a first number in response to at least one interrupt. The count is decremented by a second number in response to a clock if the count is greater than zero. An interrupt rate is determined from the count. A fault collection unit (FCU) is updated when the interrupt rate exceeds a threshold.

Alternative embodiments of the method for high frequency detection of interrupts include one of the following features, or any combination thereof. A plurality of interrupt lines are combined to form the at least one interrupt indicator. At least one of the plurality of interrupt lines are enabled with a mask configuration register. The clock is divided by a clock division factor. The FCU stores at least one of the first number, the second number, a plurality of interrupt lines, a mask configuration register, a clock division factor and the threshold. The count is reset to zero after updating the FCU. The updated FCU indicates an early warning (e.g. a status bit is set in response to the early warning). The updated FCU indicates a severe alarm (e.g. a status bit is set in response to the severe alarm). Updating the FCU results in at least one of disabling a peripheral, disabling an interrupt, changing an interrupt routing and reconfiguring a device or software to a different operating mode.

In another embodiment, a detector for high frequency interrupts comprises a counter configured to increment a count by a first number in response to at least one interrupt, and decrement the count by a second number in response to a clock if the count is greater than zero. A threshold detector is configured to update a fault collection unit (FCU) when an interrupt rate determined from the count exceeds a threshold.

Alternative embodiments of the detector for high frequency interrupts include one of the following features, or any combination thereof. A collector is configured to combine a plurality of interrupt lines to form the at least one interrupt. A mask configuration register is configured to enable at least one of the plurality of interrupt lines. At least one interrupt is responsive to a request from a communication port of a processor. At least one interrupt is responsive to a request from a peripheral of a processor. At least one interrupt is responsive to a request between two virtual machines. The counter is configured to reset to zero after updating the FCU. A clock configuration register is configured to divide the clock by a clock division factor. The first number is stored in a configurable first register. The threshold is stored in a configurable threshold register.

In another embodiment, a detector for high frequency interrupts comprises a device configured to count a difference of a first number of at least one interrupt scaled by a first configurable factor and a second number of a plurality of clock transitions divided by a second configurable factor. A collector is configured to combine a plurality of interrupt lines to form the at least one interrupt. A mask configuration register is configured to enable at least one of the plurality of interrupt lines. A threshold detector is configured to update a fault collection unit (FCU) when the difference exceeds a configurable threshold.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A method for high occurrence rate detection of interrupts comprising:
   incrementing a count by a first number in response to at least one interrupt;
   decrementing the count by a second number in response to a clock if the count is greater than zero;
   determining an interrupt rate from the count; and
   updating a fault collection unit (FCU) when the interrupt rate exceeds a threshold.

2. The method of claim 1 further comprising combining a plurality of interrupt lines to form the at least one interrupt.

3. The method of claim 2 further comprising enabling at least one of the plurality of interrupt lines with a mask configuration register.

4. The method of claim 1 further comprising dividing the clock by a clock division factor to reduce a rate by which the second number is decremented.

5. The method of claim 1 further comprising, storing by the FCU, at least one of the first number, the second number, a plurality of interrupt lines, a mask configuration register, a clock division factor, and the threshold.

6. The method of claim 1 further comprising resetting the count to zero after updating the FCU.

7. The method of claim 1 wherein updating the FCU sets a status bit in response to an early warning.

8. The method of claim 1 wherein updating the FCU sets a status bit in response to a severe alarm.

9. The detector of claim 1 wherein updating the FCU results in at least one of disabling a peripheral, disabling an interrupt, changing an interrupt routing and reconfiguring a device or software to a different operating mode.

10. A detector for high frequency interrupts comprising:
    a counter configured to increment a count by a first number in response to at least one interrupt, and decrement the count by a second number in response to a clock if the count is greater than zero; and
    a threshold detector configured to update a fault collection unit (FCU) when an interrupt rate determined from the count exceeds a threshold.

11. The detector of claim 10 further comprising a collector configured to combine a plurality of interrupt lines to form the at least one interrupt.

12. The detector of claim 11 further comprising a mask configuration register configured to enable at least one of the plurality of interrupt lines.

13. The detector of claim 10 wherein the at least one interrupt is responsive to a request from a communication port of a processor.

14. The detector of claim 10 wherein the at least one interrupt is responsive to a request from a peripheral of a processor.

15. The detector of claim 10 wherein the at least one interrupt is responsive to a request between two virtual machines.

16. The detector of claim 10 wherein the counter is configured to reset to zero after updating the FCU.

17. The detector of claim 10 further comprising a clock configuration register configured to divide the clock by a clock division factor to reduce a rate by which the second number is decremented.

18. The detector of claim 10 wherein the first number is stored in a configurable first register.

19. The detector of claim 10 wherein the threshold is stored in a configurable threshold register.

20. A detector for high frequency interrupts comprising:
    a device configured to count a difference of a first number of at least one interrupt scaled by a first configurable factor and a second number of a plurality of clock transitions divided by a second configurable factor, a collector configured to combine a plurality of interrupt lines to form the at least one interrupt, a mask configuration register configured to enable at least one of the plurality of interrupt lines; and
    a threshold detector configured to update a fault collection unit (FCU) when the difference exceeds a configurable threshold.

* * * * *